United States Patent [19]

Peters et al.

[11] 3,971,768

[45] July 27, 1976

[54] VAPOR PHASE REACTOR OFF-GAS RECYCLE SYSTEM FOR USE IN THE VAPOR STATE POLYMERIZATION OF MONOMERS

[75] Inventors: Edwin F. Peters, Winfield; Michael J. Spangler, Dolton; Glenn O. Michaels, South Holland; James L. Jezl, St. Charles, all of Ill.

[73] Assignee: Standard Oil Company (Indiana), Chicago, Ill.

[22] Filed: Dec. 16, 1974

[21] Appl. No.: 533,021

[52] U.S. Cl. ............................. 526/68; 260/95 C; 526/344; 526/346; 526/348; 526/351; 526/352
[51] Int. Cl.² ..................... C08F 2/34; C08F 10/00; C08F 14/06
[58] Field of Search ............ 260/94.9 P, 93.7, 95 C, 260/92.8 R, 94.3, 93.5 S

[56] References Cited
UNITED STATES PATENTS

| | | | |
|---|---|---|---|
| 2,292,897 | 8/1942 | Nielsen | 259/4 |
| 2,797,908 | 7/1957 | Zubrzycki | 263/21 |
| 2,936,303 | 5/1960 | Goins | 260/94.9 P |
| 3,023,203 | 2/1962 | Dye | 260/94.9 P |
| 3,049,527 | 8/1962 | Powelson | 260/94.9 P |
| 3,078,261 | 2/1963 | Wisseroth et al. | 260/92.8 P |
| 3,245,762 | 4/1966 | Ullrich et al. | 23/285 |
| 3,338,986 | 8/1967 | Leibson et al. | 260/94.9 P |
| 3,368,875 | 2/1968 | Tulleners | 23/288 |
| 3,469,948 | 9/1969 | Anderson et al. | 260/94.9 P |
| 3,514,501 | 5/1970 | Leibson et al. | 260/878 |
| 3,522,227 | 7/1970 | Thomas | 260/92.8 R |
| 3,625,932 | 12/1971 | Green | 260/92.8 R |
| 3,652,527 | 3/1972 | Trieschmann et al. | 260/94.9 P |
| 3,770,714 | 11/1973 | Dorschner et al. | 260/94.9 P |

*Primary Examiner*—Alan Holler
*Attorney, Agent, or Firm*—Reed F. Riley; Arthur G. Gilkes; William T. McClain

[57] ABSTRACT

An essentially total reactor off-gas recycle process essentially isobaric in nature is herein disclosed for use in polymerizations wherein a polymerizable monomer or a mixture thereof is polymerized in a vapor state polymerization process using a stirred-bed, quench-cooled, horizontal reactor.

14 Claims, 1 Drawing Figure

VAPOR PHASE REACTOR OFF-GAS RECYCLE SYSTEM FOR USE IN THE VAPOR STATE POLYMERIZATION OF MONOMERS

SUMMARY OF THE INVENTION

This invention relates to a novel process for the essentially total recycle of reactor off-gases from a continuous, vapor phase polymerization reactor and, more specifically, to a novel, continuous, essentially isobaric process for the essentially total recycle of reactor off-gases during the vapor phase polymerization of a monomer or mixture thereof in a horizontal, quench-cooled, stirred-bed reactor.

In accordance with the instant invention a continuous, essentially isobaric process is taught for the essentially total recycle of reactor off-gases during the vapor phase polymerization of a monomer or mixture thereof in a horizontal, quench-cooled, stirred-bed, tubular reactor containing a polymer bed wherein the quench liquid contained in the reactor off-gases is at least in part separated in a separation zone from monomer, hydrogen, if used, and entrained polymer fines and thereafter a major amount of such quench liquid and the polymer fines are returned to the reactor and a minor amount of the quench liquid returned to a catalyst make-up zone and thereafter to the reactor and wherein separated gaseous monomer and hydrogen together with make-up amounts of monomer and hydrogen are returned largely or completely below the surface of the stirred, polymer bed in the reactor.

BACKGROUND OF THE INVENTION

One of the problems in solution or slurry polymerization of monomers is the capital costs required in the production thereof. Monomer polymerization using a vapor phase process cn be considerably more economical if certain problems inherent in vapor state polymerization can be solved. These include problems of carrying out the polymerization in a thermally controlled fashion so as to avoid hot spots, maintaining a proper product particle size distribution and, in the case where catalysts are utilized which have extremely high yields but are extremely sensitive to poisoning, decreasing to a minimum the amount of make-up material seen by the catalyst per amount of product formed. Now we have discovered a reactor off-gas treatment process which largely solves the above referred to problems and realizes important economic benefits through savings in energy consumption, raw materials and capital equipment.

In U.S. Pat. No. 2,936,303 (Goins) a vapor state polymerization of ethylene, propylene or mixtures thereof is carried out in a countercurrent, fluidized bed in the presence of inert diluent gas. In the process described therein catalyst in solid form is passed downwardly in the reactor and, for example, ethylene mixed with diluent gas is passed countercurrently up through a series of vertical fluidized bed reaction zones. In this process the reaction in the various reaction zones can be controlled independently by taking off-gas from the last reaction zone, cooling it, and recycling portions of such off-gas to each of the reaction zones. However, because of the use of diluent gas and a fluidized bed large quantities of gas must be passed through the reactor per unit of polymer produced.

In U.S. Pat. No. 3,023,203 (Dye) a suspended, gas phase polymerization of olefins using a reactor having three concentric superimposed vertical sections, comminuted catalyst addition suspended in the entering gases and temperature regulation by gas cooling is shown. The process includes polymer removal without pressure letdown.

In U.S. Pat. No. 3,254,070 (Roelen) a method for the gas phase polymerization of ethylene using conventional cooling is described wherein a mixture of reaction products and solid or liquid catalysts is constantly being mechanically subdivided. This patent additionally teaches that the reacting material may be agitatingly moved through a number of stages each with different polymerization conditions. An additional mode described therein teaches that the first few stages may be carried out using liquid phase polymerization finishing up with polymerization in the vapor phase. Different polymerization temperatures may be used in the separate reactors.

In U.S. Pat. No. 3,256,263 (Wisseroth et al.) a method of removing heat and producing intensive movement of the polymeric product produced during the gas phase polymerization of olefins in a stirred, vertical, fluidized reactor is described using mechanical agitation and introduction of the polymerization monomer immediately after expansive cooling in the form of moving gas or liquid jets.

In U.S. Pat. No. 3,300,457 (Schmid et al.) polymerization of mono-olefins, particularly ethylene and propylene, is accomplished in a fluidized bed using a stirred, vertical reactor. Catalysts and polymer in the reactor are moved in the direction of flow of the mono-olefin by the stirring and heat is removed by cooling the walls of the vessel, by conduction using the gas stream, or by the introduction of liquefied mono-olefin.

In U.S. Pat. No. 3,469,948 (Anderson et al.) a horizontal, paddle type polymerization reactor using pulsed gases including the polymerization olefin is described. The teaching of this patent is directed to the use of longitudinally oriented paddles which are suitably shaped to give forward movement to the solid polymer resulting from the vapor phase polymerization.

In U.S. Pat. No. 3,652,527 (Trieschmann et al.) a process for the gas phase polymerization of propylene in a stirred-bed, vertical reactor using evaporative cooling of the reaction is described. This patent teaches that it is essential that one component of the catalyst combination must be directly placed on the bed of solid polymer produced in the polymerization and the second catalyst component must be introduced in the gas phase above the bed.

Finally, in British Patent No. 1,354,020 (Badische) a vapor phase olefin polymerization process is described in which the heat generated in the polymerization process is removed by the introduction of the monomer and heat transfer agents in gaseous or liquid state in the polymerization zone. However, the use of multiple polymerization temperatures in the vertical, stirred, fluid-bed reactor is not taught and it is difficult to see how much individual control could be accomplished in the apparatus described.

STATEMENT OF THE INVENTION

The invention described herein is a process for the essentially isobaric, essentially total reactor off-gas recycle from a horizontal, vapor phase, polymerization reactor, which reactor operates in a quench-cooled, stirred-bed fashion. The recycle process is particularly adapted for use with polymerization catalysts and cocatalysts which produce very high yields of polymeric product.

In general, the process involves a controlled introduction of catalyst components, monomer or mixtures thereof and quench liquid into the one or more polymerization sections of the horizontal reactor directly onto a stirred, subfluidized bed of polymer forming from the polymerization of monomer from the gas phase in and over such polymer bed. The process introduces recycle gases largely underneath the polymer bed, quench liquid onto the moving surface of the bed and catalyst components into or onto the bed.

The reactor may have one or more polymerization sections separated from each other by weirs or other suitably shaped baffles to prevent gross backmixing between sections and each section may be individually controlled in terms of polymerization temperature and/or polymer production rate so that a polymeric product having a controlled spread of molecular weight and particle size may be produced. Provision may also be made to divide the reactor into two or more compartments each compartment having a separately controllable hydrogen partial pressure and a separate separation zone and recycle vapor return.

Reactor off-gases are removed along the top of the reactor after advantageously substantially removing polymer fines from the off-gases. The reactor off-gases are then taken to a separation zone wherein the quench liquid is at least in part separated along with further polymer fines and some of the catalyst components from the polymerization monomer or monomers and hydrogen, if used, which monomer or monomers and hydrogen are then recycled to inlets in the various polymerization sections along the reactor generally underneath the generally subfluidized polymer bed contained therein. A portion of the quench liquid is taken off the separation zone and a major portion of such take-off containing the further polymer fines returned to the inlets at the various sections along the top of the reactor and a minor portion, essentially purified of cocatalyst, if used, and polymer fines is fed into a catalyst make-up zone for dilution purposes so that fresh quench liquid need not be introduced for that purpose.

Provision may be made to introduce the catalyst components, quench liquid and recycle gases at different rates into the different sections of the reactor so that the polymerization temperatures and polymer production rates of the individual sections may be individually controlled. The concentration of catalyst components may be varied in the various sections in order to change and control polymer production rate, polymer molecular weight and particle size distribution. Catalyst components may be added into or onto the stirred bed.

The recycle system of the process is designed so it together with the reactor operate essentially isobarically. That is, preferably there is not more than a $\pm 25$ psig pressure change in the recycle system and reactor, more preferably, $\pm 10$ psig which is the normal pressure drop expected from operations.

By the term vapor state reactor or process is meant a reactor or process, the monomer or monomers of which are vapors or gases under conditions prevailing in the reactor.

Figure 1:
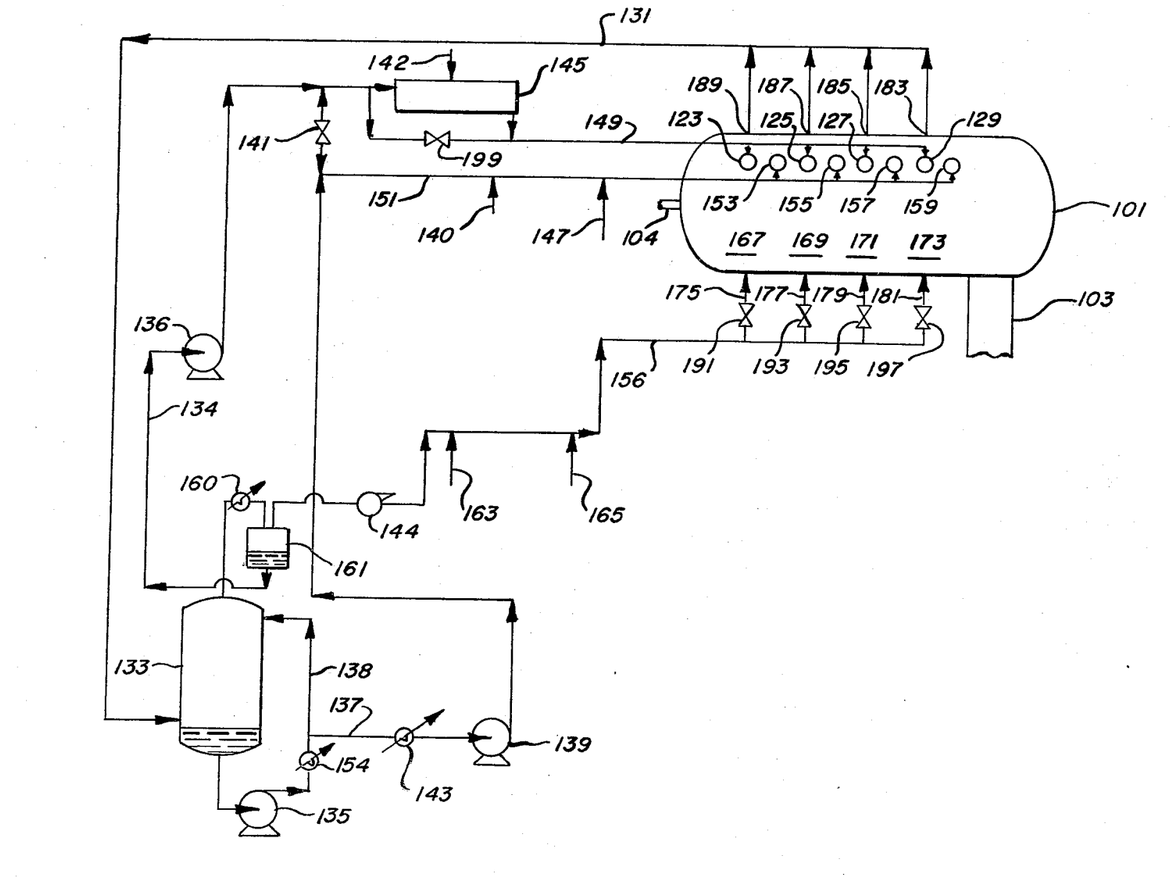
The FIGURE shows one embodiment of the process described herein.

One embodiment of the process is shown in detail in the Figure and such process can be roughly divided into two areas, the reactor area and the reactor off-gas treatment (quench liquid separation) and catalyst make-up area.

As may be seen by looking at the Figure, horizontal polymerization reactor 101 is divided into several stirred sections 167, 169, 171 and 173 to provide for the possibility of operating the sections of the reactor at different polymerization temperatures and polymer production rates. The polymer bed of the reactor is stirred by impellors formed by a plurality of transversely extending paddles adjacently attached along a longitudinally placed drive shaft 104, which shaft is typically located concentrically in the reactor. Polymerization takes place in each of the aforementioned sections to form a polymer bed distributed throughout the reactor.

The polymerization temperature in each of the sections may be individually controlled by a combination of methods including the stirring, the controlled differential introduction of vapor recycle into each of the sections through inlets 175, 177, 179 and 181 along the bottom of the reactor and, the introduction into each of the sections of inert quench liquid and catalyst components at different rates through quench liquid inlets 153, 155, 157 and 159 and catalyst inlets 123, 125, 127 and 129 spaced along the top of the reactor.

Where the reactor is to operate in a differential hydrogen mode, the reactor is further divided into two or more compartments each having a controllable vapor composition by one or more dividing structures within the reactor, which structures extend upwardly filling the cross-section of the reactor. A perforation or opening is made in each of such dividing structures below the bed height so that the polymeric powder in the bed may travel freely from one compartment to the adjacent one and ultimately out in polymer take-off vessel 103. The dividing structures are provided so that intermixing of the vapors in adjacent compartments can be controlled. In such a mode each of the compartments has a separate reactor off-gas separation zone and vapor recycle system and provision may be made for the introduction of differential amounts of hydrogen and monomer into each of the compartments.

Generally, the dividing structures are designed to prevent extensive intermixing of the vapors in the individual compartments, however, in one mode of multiple hydrogen operation the vapors are deliberately mixed by feeding the vapors from the hydrogen poor compartment to the hydrogen rich compartment and adding make-up monomer, similarly to the hydrogen poor compartment and hydrogen make-up similarly to the hydrogen rich compartment.

Reactor off-gases are removed through outlets 183, 185, 187 and 189. Since a certain deleterious amount of polymer fines may be produced in the reactor they are advantageously, substantially removed prior to transfer of the reactor off-gases to the reactor off-gas separation and catalyst make-up areas by using traps, filters, settlers, cyclones or scrubbers or a combination thereof.

A plurality of catalyst and quench inlets can be used in reactor 101 and one or more pairs of catalyst and quench inlets may be used for each reactor section 167 to 173. The catalyst and quench inlets are typically designed so that catalyst and quench liquid are distributed onto the top of the stirred bed at roughly the same location. Such introduction of catalyst and quench liquid combined with adequate agitation has been found to provide more uniform polymerization and prevent localized polymer fusion in the polymer bed and hence reduce the number of molten plugs of polymer and give more trouble free performance of the reactor. It is advantageous in one mode of carrying out polymerization in the reactor to provide for separately controlled addition of catalyst components and quench liquid on the polymerization sections by means of, for example, valves. Such separately controlled additions into reactor sections 167–173 provide for separate control of reactor polymerization temperatures and polymer production rates among the sections and can be used to vary and control the molecular weight, molecular weight distribution and particle size distribution of the polymer.

Catalyst, dissolved or slurried in recycle quench liquid, is advantageously introduced onto the surface of the bed in at least one of the various reactor sections through inlets 123, 125, 127, and 129. Similarly placed inlets 153, 155, 157 and 159 are used to introduce recycle quench liquid, which may contain cocatalyst make-up from line 147, onto the bed in the individual reactor sections. However, depending upon the nature of the catalyst, cocatalyst and monomer to be polymerized, catalyst and/or cocatalyst can be sprayed or otherwise introduced into the reactor neat or in other non-polymerizable vehicles. Alternatively, for some monomers, catalyst and cocatalyst can be added in make-up zone 145 and together added to reactor 101.

In one mode of operation it has been found advantageous to make the catalyst and quench liquid inlets concentric so that the catalyst and quench liquid are sprayed into the reactor and onto the surface of the polymer bed in such a way as to more evenly distribute catalyst components on the polymer bed surface. However, the catalyst and quench inlets may be made separate and the catalysts and quench liquid introduced separately onto the bed.

The reactor off-gases are taken via line 131 to scrubber tower 133 wherein the quench liquid component of the off-gases is at least in part removed from the polymerizable monomer and hydrogen, if used. Such polymerizable monomer and hydrogen containing some quench liquid are removed from the top of scrubber tower 133 after, advantageously, passing through heat exchanger 160, separator 161 and blower 144 via vapor recycle line 156 with additional hydrogen and monomer make-up being added via lines 163 and 165. Alternatively, monomer and hydrogen can be returned from scrubber tower 133 to reactor 101 bypassing heat exchanger 160 and separator 161. The amount of the vapor recycle introduced into the individual sections of the reactor via inlets 175, 177, 179, and 181 can be individually controlled by valves 191, 193, 195, and 197. The quench liquid of separator 161 is essentially free of polymer fines and catalyst components and suitable for use in catalyst make-up zone 145.

Quench liquid, separated from the reactor off-gases, is cooled by heat exchanger 154 and returned in major portion to the top of scrubber tower 133. A minor portion of the quench liquid is returned through line 137, heat exchanger 143, pump 139 and quench liquid recycle line 151 to quench liquid inlets 153, 155, 157, and 159 carrying with it some monomer, hydrogen and any polymer fines carried by the off-gases into scrubber tower 133. In the important embodiment in which cocatalyst is used, make-up cocatalyst may be introduced via line 147 as a solution or slurry in the recycle quench liquid stream. A small portion separated quench liquid essentially free of polymer fines and catalyst components is taken off separator 161 via line 134 and pumped through pump 136 to catalyst make-up zone 145. Make-up quench liquid is added through line 140.

Polymerization in catalyst make-up zone 145 or associated line 149 and inlet 123–129 can cause serious plugging problems and may be controlled by keeping the cocatalyst concentration in catalyst make-up zone 145 below a certain value, the value depending upon the catalyst and cocatalyst used and the monomer to be polymerized. In a case where cocatalyst is introduced through catalyst make-up zone 145, polymerization, if a problem, can be reduced by temperature lowering of, shortening the residence time in, etc., make-up zone 145. Alternatively, make-up quench liquid from line 147 can be used in catalyst make-up zone 145 in place of recycle quench liquid to prevent polymerization of monomer is said zone.

Valve 199 has been provided in the catalyst make-up zone bypass line in order to more easily vary the concentration of catalyst in the catalyst make-up introduced into the reactor. It has been found that particle size of the polymer produced in reactor 101 can be advantageously varied by varying the concentration of the catalyst being introduced through inlets 123, 125, 127 and 129. Further, it has been found advantageous to vary the catalyst concentration either by changing its concentration in make-up zone 145 or, alternatively, to change its concentration by introducing quench liquid into catalyst line 149 via valve 199 just prior to the point where the catalyst enters the catalyst inlets. Make-up catalyst is added through line 142.

The interior of the reactor is equipped with a rotating paddle drive shaft 104 extending longitudinally through reactor 101 to which are attached paddles extending transversely from the shaft and making close clearance with the inside wall of reactor 101 to insure adequate bed mixing at the reactor wall. The paddles are preferably flat to maximize bed agitation for a given rotational speed and preferably two paddles per impellor are used. The width of the paddles is such that between about four to about 12 impellors (eight to 24 paddles) will be present in a reactor section of about 3 feet in length. The orientation of the paddles on adjacent impellors is about 90°. The paddles are so constructed to minimize any forward or backward movement of the bed during stirring and are driven at such a speed as to give a slow turnover of the entire polymer bed contained in the reactor. The speed at which the impellors turn should be fast enough to provide the desired heat and mass transfer between liqid, solid and gas but not so fast that the finer portions of the polymer bed are thrown up in large quantities into the space above the bed. That is, the speed typically is about 5 to about 30 RPM so that the integrity of the bed is maintained.

The section after the take-off barrier and above the take-off vessel may be likewise equipped with one or more two-paddle impellers, the number of which depends upon the size of the take-off. However, other take-off assemblies such as end or side take-off apertures, which assemblies replace the take-off barrier, may be used as may be understood by one skilled in the art.

Vapor recycle which includes the polymerizable monomer and hydrogen, if used, is brought in through vapor recycle line 156 to vapor recycle inlets 175 to 181 generally at a rate designed to prevent fluidization of the bed. The rate at which the vapor recycle gases are introduced into the individual sections 167 to 173 can be controlled by valves 191 to 197 and such control may be used to help vary the section polymerization temperatures.

In an important embodiment of the process described herein in which the polymerization temperature of one or more of the sections is held at a different value than that in the other sections (dual temperature operation or multi-temperature operation), it is advantageous to vary the amounts of any or all of the catalyst components being introduced into the various sectons. Particle size distribution and molecular weight distribution are advantageously affected thereby. This may be accomplished by feeding the catalyst inlets of the different sections individually. Even in single temperature operation, it can be advantageous to feed one or more of the sections with catalyst components in different amounts than catalyst components being introduced into the other section or sections.

The overall reactor temperature range for a polymerization depends upon the particular monomer which is being polymerized and the commercial product desired therefrom and as such are well known to those skilled in this art. In general, the temperature range used varies between about 40°C up to the softening temperature of the bed. The total polymerization pressure is composed of the polymerizable monomer pressure, vaporized quench liquid pressure and hydrogen pressure, if used, and such total pressure typically varies from above about atmospheric to about 600 p.s.i.g. The individual partial pressures of the components making up the total pressure determine the rate at which polymerization occurs, the molecular weight, and the molecular weight distribution of the polymer to be produced. The temperature of polymerization is controlled as may be understood by one skilled in the art.

The process described herein may be applied to the polymerization of polymerizable monomers which are polymerizable below the softening points of their polymeric forms including ethene, propene, 4-methylpentene-1, butene-1, vinyl chloride, butadienes, styrene, poly(ethyleneterephthalate) and mixtures of such monomers. Particularly suitable are the polymerization of ethene and propene.

The quench liquid used for temperature control is a readily volatilizable liquid which can be sprayed onto the surface of the polymer bed to evaporatively conduct heat away from the polymer bed and thus must be inert to the monomer being polymerized, the catalyst components used in the polyermization, and have as high a heat of evaporation as is consistent with readily volatilization of the quench liquid in the reactor at the polymerization temperature. In general alkanes such as propane, a butane, a pentane, or a hexane or closely boiling mixtures thereof may be used. The preferred quench liquid for ethene is isobutane or isopentane. It should be understood that where the monomer to be polymerized is readily condensible, e.g. propene, the quench liquid can be liquified monomer or a mixture of liquified monomer and an additional quench liquid.

The rate of quench liquid addition should be low enough to keep the polymer bed dry, i.e. maintain the partial pressure of the quench liquid vapor below the due point, yet large enough to obtain the maximum cooling effect of the quench liquid. Generally, the quench liquid will carry away fifty percent or more of the heat of polymerization. For propene polymerization over ninety percent of the heat of polymerization is desirably removed by the quench liquid. At a 200°F polymerization temperature in the polymerization of ethene, desirably more than seventy percent of the heat of polymerization is removed using isobutane and more than 50 percent of the heat is removed using isopentane.

In general, the catalysts which are most useful to the process described herein are those which are very active and give a high yield on catalyst. Included in this group are cocatalysts composed of organometallic compounds of Periodic Groups IA, IIA and IIIA and catalysts which are based on transition metal compounds. Aluminum alkyl compound coatalysts are especially preferred and include trialkylaluminums and alkylaluminum halides such as a dialkylaluminum chloride. The transition metal catalyst can be a metal compound of Group IV or Group V such as a titanium or vanadium compound, a compound of Group VI such as chromium or molybdenum oxide or may be one of the above catalysts supported on a magnesium-based support or a support such as alumina, silica, or silica-alumina.

The preferred catalysts and cocatalysts are as aforesaid high yield catalysts, By high yield is meant catalysts and cocatalysts, the residues of which, do not have to be removed from the products of the process.

The preferred catalysts and cocatalysts for ethene polymerization are a trialkylaluminum cocatalyst with a catalyst which is a titanium compound supported on magnesium-based support or chromium oxide supported on alumina, silica or silica-alumina. For propene polymerization it is preferable to use a dialkylaluminum chloride cocatalyst and a catalyst which is an active titanium trichloride. However, the process and apparatus described herein are not meant to be limited to the catalyst and cocatalyst used except in that the process operates best using high yield catalysts.

While the invention is described in connection with the specific Examples below, it is to be understood that these are for illustrative purposes only. Many alternatives, modifications, and variations will be apparent to those skilled in the art and such alternatives, modifications and variations fall within the spirit and scope of the appended claims.

EXAMPLE I

A supported titanium chloride catalyst was suspended in isopentane at a concentration of 30 milligrams/liter and pumped continuously to the reactor at a rate of 300 milliliters/hour. Aluminum triethyl diluted with isopentane to 1000 milligrams/liter was pumped continuously at a rate to maintain the desired weight ratio of aluminum triethyl/catalyst, 3/1 to 15/1. Ethylene was charged continuously at the rate of polymerization to maintain pressure, 300 psig. A continuous stream of gas, 0.3 cubic feet/hour, was removed from the reactor for gas chromatographic analysis to maintain the hydrogen concentration in the reactor at 34 mol percent by intermittent hydrogen addition for polymer molecular weight control. The reactor polymer bed temperature was held at 160°F. by continuously spraying isopentane at the apropriate rate onto the 30 R.P.M. stirred polymer bed. The vaporized isopentane was condensed and recycled. The non-condensed gas (40° to 50°F.) was continuously recycled back into the bottom of the stirred polymer bed. The polymer bed level was maintained by the opening position in the retaining weir. The polymer overflow spilled out into the melter which was maintained at 350° to 400°F. by a combination of polymerization heat and external electrical heat. The melted polymer pumps to the bottom and was forced through a horizontal piece of ¾ inch diameter × 4 foot long pipe at 400° to 500°F. by the reactor pressure. Water was injected continuously into the polymer melt between the melter and catalyst deactivator at a rate of 10 milliliters/hour. Polymer melt extrudes from the catalyst deactivator through a ⅜ inch diameter opening and is drawn through a water bath and chopped. Polymer was produced at the rate of 1 to 3 pounds/hour at a yield level of 100,000 grams polymer/gram catalyst. Physical properties of the polymer taken out of the melter are shown below in Table I and some properties of the polymer powder taken from the reactor are shown in Table II.

EXAMPLE II

A carbon steel reactor approximately 2 feet in diameter by 3.0 feet in length was used in this continuous ethylene-propylene polymerization. Temperatures were 181°F at one end of the reactor, 171°F at the center of the reactor and 181°F near the take-off weir end and reactor total pressure was 400 psig. Ethylene was fed to the reactor at 20.57 pounds/hour and propylene was added at 0.29 pounds per hour. The recycle gas rate was 2.29 actual cubic feet per minute and the recycle quench liquid, isopentane, rate was 0.29 gallons/minute. The supported titanium catalyst was added at about 0.3 grams per hour as a dilute slurry in isopentane. The amount of slurry added was about 3 gallons per hour. Triethylaluminum cocatalyst was added as a solution in isopentane at a rate of 35 milliliters per hour at a concentration of 0.025 grams triethylaluminum per milliliter.

Gas analyses of reactor recycle gases were continuously made and typical values were: hydrogen, 37 mol percent; ethane, 0.3 mol percent; propene, 1.1 mol percent; isopentane, 1 mol percent and ethene, 60.6 mol percent.

TABLE I

Conditions: 160°F, 300 psig, 34 mol percent $H_2$, 13/1 to 15/1 triethyl aluminum/catalyst weight ratio

| General Properties | Run A | Run B[1] |
|---|---|---|
| Unannealed density, grams/cubic centimeter | 0.961 | 0.959 |
| Annealed density, grams/cubic centimeter | 0.977 | 0.977 |
| Inherent viscosity, dl/gram | 1.87 | 2.29 |
| Melt index, $MF_1$, grams/10 minutes | 0.92 | 0.44 |
| Melt index, $MF_{10}$, grams/10 minutes | 38 | 24 |
| Flow rate ratio, $MF_{10}/MF_1$ | 41.4 | 54.5 |
| Hexane extractables, weight percent | 0.47 | 0.41 |
| Oven volatiles content, weight percent | 0.20 | 0.28 |
| Stiffness, psig | 165,000 | 160,000 |
| Molecular Weight Parameters, GPC | | |
| Molecular weight distribution, Mw/Mn | 7.6 | 10.5 |
| Tensile Properties | | |
| Tensile strength at yield, psig at 2 inches/minute | 4540 | 4600 |
| Tensile strength at ultimate, psig at 2 inches/minute | 3410 | 2810 |
| Elongation at yield, percent at 2 inches/minute | 10 | 11 |
| Elongation at ultimate, percent at 2 inches/minute | 1200 | 689 |
| Impact Properties | | |
| Tensile impact strength, ft-lb/in² | 65 | 88 |
| Izod impact strength, ft-lb/in notch | 9.2 | 9.8 |
| Thermal Properties | | |
| Vicat softening point, °F | 266 | 262 |
| Brittleness temperature, °C | — | — |

[1]Triethylaluminum/catalyst weight ratio = 2.6/1 to 3.75/1.

TABLE II

Conditions: 160°F, 300 psig, 34 mol percent $H_2$, 13/1 to 14/1 triethylaluminum/catalyst weight ratio

| | RUN A | | | RUN B |
|---|---|---|---|---|
| Cut number | 5R | 8R | 10R | |
| Total polymer produced, grams | 3628 | 5509 | 6637 | 1952 |
| Inventory turnover (No. of times) | 3.0 | 4.6 | 5.5 | 1.6 |
| Percent original inventory remaining | 5 | 1 | 0.4 | 20 |
| Bulk density, grams/cubic centimeter | 0.36 | 0.37 | 0.37 | 0.41 |
| $MF_{10}$ | 28.7 | 38.7 | 48.2 | — |
| $MF_1$ | 0.89 | 1.0 | 1.3 | — |
| $MF_{10}/MF_1$ | 32.3 | 38.7 | 37.1 | — |

The melt index of product was about 0.58 grams/10 minutes.

EXAMPLE III

Ethylene was polymerized in the same manner described in EXAMPLE I. The catalyst was 2.0 weight percent chromium trioxide on W. R. Grace No. 952$SiO_2$. Catalyst was calcined at 1200°F. with dry oxygen for 12 hours. Catalyst, triisobutylaluminum and ethylene were continuously charged to the reactor at 210°F. under 300 psig. pressure. Hydrogen was charged as needed to maintain 35 mol percent $H_2$ in the reactor. The mole ratio of $Al(i-Bu)_3/CrO_3$ was 3. Polymer yield based on catalyst was 4,600 grams/gram. Polymer was removed continuously as a melt. The polymer produced showed the following physical properties;

TABLE III

| Cut | M.I. | $MF_{10}$ | $MF_{10}/MF_1$ | Wt. Percent Extractables | Wt. Percent Volatiles | Mw/Mn |
|---|---|---|---|---|---|---|
| 5 | 0.20 | 22.2 | 111 | 1.5 | 0.65 | 14.7 |
| 6 | 0.12 | 16.6 | 138 | 1.6 | 0.87 | 17.0 |
| 7 | 0.12 | 20.2 | 168 | 1.8 | 0.98 | 15.4 |

EXAMPLE IV

Propylene was polymerized by an active titanium chloride catalyst with diethylaluminum chloride cocatalyst continuously in the gas phase under conditions tabulated in Table IV. The propylene served as its own quench liquid for heat removal. Polymer was intermittently removed as particulate through a double ball-valved lock chamber attached to the take-off end of the reactor.

with the ethylene. Liquid propene was added continuously at the rate of 30 milliliters/hour which maintained its concentration at 3 mol percent in the reactor gas. Copolymer was removed by way of a double ball-valved lock chamber attached to the take-off end of the reactor as particulate. Catalyst and cocatalyst were deactivated by treating the copolymer with 250°F. steam. A copolymer inhibitor package was added and the product thereof was melt extruded in the normal manner to form product pellets. Conditions of two such

TABLE IV

POLYMERIZATION OF PROPYLENE
Catalyst: Titanium trichloride
Cocatalyst: Diethylaluminum chloride
Conditions: 160°F, 300 psig, 1 mole percent hydrogen

| | | | | | |
|---|---|---|---|---|---|
| Time on stream, minutes | 145 | 270 | 153 | 225 | 162 |
| Type of catalyst addition | Batch | Batch | Continuous | Batch | Continuous |
| $Et_2AlCl/TiCl_3$ ratio | 2.8 | 2.8 | 3.0 | 2.8 | 2.9 |
| $TiCl_3$ addition rate, milligrams/hour | 48[1] | 24–48[2] | 45 | 24–48[2] | 46 |
| Total polymer produced, grams | 165 | 486 | 296 | 358 | 300 |
| Polymer yield, grams/gram | (0–145 min) 1970 (0–60 min) 640 (60–145 min) 4600 | (0–270 min) 3120 (0–60 min) 1225 (60–120 min) 3800 | (0–153 min) 2600 | (0–225 min) 2980 (0–90 min) 172 (90–225 min) 7200 | (0–162 min) 2040 | runs are shown in Table V below.

TABLE V

| Run period | 1 | 2 | 3 | 4 | 5A | 5B | 6 | 7 | 8 | 9 | 10 | 11 |
|---|---|---|---|---|---|---|---|---|---|---|---|---|
| Time on stream, hours, minutes | 5,12 | 3 | 5,20 | 4,22 | 3,8 | 3,8 | 6,37 | 7,10 | 6,55 | 4,22 | 3,15 | 2,45 |
| Temperature, °F | 179 | 178 | 179 | 177 | 178 | 178 | 180 | 182 | 186 | 185 | 207 | 207 |
| Total pressure, psig | 300 | 300 | 300 | 300 | 300 | 300 | 300 | 300 | 300 | 300 | 300 | 300 |
| Ave. catalyst, feedrate, milligrams/hour | 37.0 | 29.1 | 30.9 | 33.3 | 40.2 | 40.2 | 42 | 37 | 33.3 | 37.9 | 39.2 | 41.0 |
| *TEA/CAT | 7.5 | 7.5 | 7.5 | 7.5 | 7.5 | 15 | 7.5 | 7.5 | 7.5 | 15 | 15 | 7.5 |
| Recycle gas composition, mol percent | | | | | | | | | | | | |
| Hydrogen | 38 | 35 | 36 | 31 | 40 | 40 | 42 | 41 | 39 | 36 | 36 | 36 |
| Ethylene | 52 | 44 | 52 | 61 | 48 | 48 | 41 | 46 | 50 | 55 | 52 | 52 |
| Ethane | 6.6 | 20.5 | 7.8 | 4.2 | 8.6 | 8.6 | 12.6 | 8.8 | 7.0 | 5.1 | 8.3 | 8.3 |
| Propylene | 2.3 | 3.2 | 3.2 | 3.2 | 2.6 | 2.6 | 3.1 | 2.9 | 3.4 | 2.9 | 3.2 | 3.2 |
| Isopentane | 1 | 1 | 1 | 1 | 1 | 1 | 1 | 1 | 1 | 1 | 1 | 1 |
| Reactor bleedrate, cubic feet/hour | 0.87 | 0.86 | 0.59 | 0.61 | 0.69 | 0.69 | 0.63 | 0.64 | 0.63 | 0.62 | 0.59 | 0.59 |
| Polymer produced, grams | 500 | 690 | 822 | 1357 | 0 | 165 | 339 | 1416 | 1015 | 1764 | 754 | 348 |
| Catalyst yield, gram/grams | 2600 | 8000 | 4980 | 9320 | 0 | 620 | 1150 | 5345 | 4410 | 10,660 | 5915 | 3130 |
| Melt index, grams/10 minutes | 0.17 | 0.2 | 0.2 | 0.17–1.0 | — | — | 6–7 | 6–7 | 6–7 | 6–7 | 6–7 | 6–7 |

| Run period | | |
|---|---|---|
| Time on stream, hours, minutes | 4, 53 | 5, 15 |
| Temperature, °F | 193 | 200 |
| Total pressure, psig | 300 | 300 |
| Av. cat. feedrate, milligrams/hour | 40 | 28 |
| TEA/CAT* | 7.5 | 7.5 |
| Recycle gas comp., mol percent | | |
| Hydrogen | 44 | 42 |
| Ethylene | 45 | 46 |
| Ethane | 7.0 | 8.0 |
| Propylene | 2.9 | 2.95 |
| Isopentane | 1 | 1 |
| Reactor bleedrate, cubic feet/hour | 0.62 | 0.67 |
| Polymer produced, grams | 1055 | 1539 |
| Catalyst yield, grams/grams | 5375 | 8800 |
| Melt index, grams/10 minutes | 12–20 | 17–19 |

*TEA/CAT is the weight ratio of triethylaluminum to catalyst used.

EXAMPLE V

A supported titanium chloride catalyst and triethylaluminum catalyst were employed in the same manner as described in Example I using approximately 3 mol percent propylene in the reactor gas to copolymerize

EXAMPLE VI

A supported titanium chloride catalyst and triethylaluminum cocatalyst were employed for the polymerization of ethylene in the same manner as Example I.

Polymer was removed by way of a double ball-valved lock chamber as particulate. Catalyst was deactivated by treating with steam at 250°F. Polymer inhibitor package was added and the result thereof was melt extruded in the normal manner to form product pellets. Polymerization product conditions and properties of the various cuts are shown below in Tables VI and VII.

EXAMPLE VII

Propylene was polymerized in essentially the same manner described in EXAMPLE I. The recycle gas and quench liquid were propylene. The melter temperature was 350°F. while the catalyst kill section operated at 400°F. An active titanium chloride catalyst (35 milligrams) with diethylaluminum chloride cocatalyst (77 milligrams), mol ratio Al/Ti = 3, was charged to the reactor every thirty minutes. Hydrogen was added as needed to maintain 2.9 mol percent in the reactor gas cap. The reactor temperature was maintained at 160°F. and the reactor pressure was controlled at 300 psig by maintaining the temperature of the recycle condenser at about 120°F. A polymer yield based on catalyst of 10,000 grams/gram was obtained. The polymer was removed from the reactor as a melt. The polymer showed a melt flow rate of 16.4 grams/10 minutes at 230°C. under a load of 2,060g. The 68°C. n-hexane extractables was 4.0 weight percent. Physical properties of the product are shown in Table VII.

EXAMPLE VIII

Ethylene was polymerized in the same manner described in EXAMPLE I except in this case two sections

TABLE VI

| Polymerization Conditions | | | | | | |
|---|---|---|---|---|---|---|
| Temperature, Zone 1 °F | 180 | 160–205 | 160–205 | 160–205 | 160–205 | 205 |
| Zone 2 °F | 175 | 160–205 | 160–205 | 160–205 | 160–205 | 205 |
| Exit port °F | 165 | 170 | 170 | 170 | 170 | 170 |
| Solvent reservoir | 137 | 150 | 150 | 145 | 150 | 150 |
| Pressure, psig | 300 | 300 | 300 | 300 | 300 | 300 |
| Reaction as composition, mol % | | | | | | |
| Hydrogen | 25 | 22 | 22 | 20 | 25 | 25 |
| Ethylene | 74 | 77 | 77 | 79 | 73 | 72 |
| Ethane | 0.2 | 0.3 | 0.3 | 0.2 | 0.4 | 0.9 |
| Isopentane | 1 | 1 | 1 | 1 | | |
| Reactor vent rate, cubit feet/hour | 0.67 | | 0.67 | 0.67 | 1.92 | 1.05 |
| Catalyst | | | | | | |
| Feeder conc., milligrams/liter | 125 | 125 | 62.5 | 62.5 | 62.5 | 62.5 |
| Feed rate, milligrams/hour | 31.9 | 25.2 | 10.6 | 8.7 | 11.9 | 4.85 |
| Cocatalyst | | | | | | |
| AlE₃ feeder conc., milligrams/liter | 1,250 | 1,250 | 625 | 625 | 625 | 625 |
| AlEt₃ feed rate, milligrams/hour | 319 | 252 | 106 | 87 | 119 | 485 |
| Weight ratio AlEt₃/catalyst | 10 | 10 | 10 | 10 | 10 | 10 |
| Polymerization Results | | | | | | |
| Total run time, hours | 9.8 | 14.8 | 1.8 | 6.2 | 7.5 | 7.8 |
| Total polymer produced, grams | 663 | 2,107 | 781 | 619 | 1,146 | 749 |
| Polymer yield on catalyst, grams/gram | 2,000 | 5,660 | 41,700 | 11,600 | 12,800 | 19,700 |
| Polymerization Conditions | | | | | | |
| Temperature, Zone 1 °F | 190 | 195 | 195 | 185 | 190 | 190 |
| Zone 2 °F | 189 | 192 | 190 | 182 | 186 | 190 |
| Exit port °F | 173 | 175 | 172 | 170 | 174 | 170 |
| Solvent reservoir | 152 | 152 | 152 | 152 | 156 | 140 |
| Pressure, psig | 300 | 300 | 300 | 300 | 300 | 300 |
| Reaction gas composition, mol % | | | | | | |
| Hydrogen | 60 | 35 | 42 | 40 | 44 | 55 |
| Ethylene | 39 | 64 | 56 | 59 | 55 | 41 |
| Ethane | 0.3 | 0.6 | 0.6 | 0.4 | 3.0 | 0.4 |
| Isopentane | | | | | | |
| Reactor vent rate, cubit feet/hour | 0.20 | 0.65 | 0.72 | 0.77 | 0.75 | 0.80 |
| Catalyst | | | | | | |
| Feeder conc., milligrams/liter | 62.5 | 125 | 80 | 62.5 | 31.2 | 40 |
| Feed rate, milligrams/hour | 21.8 | 17.2 | 9.1 | 2.9 | 11.6 | 1.1.0 |
| Cocatalyst | | | | | | |
| AlE₃ feeder conc., milligrams/liter | 625 | 1,250 | 800 | 625 | 313 | 200 |
| AlEt₃ feed rate, milligrams/hour | 218 | 172 | 91 | 29 | 116 | 55 |
| Weight ratio AlEt₃/catalyst | 10 | 10 | 10 | 10 | 7.5 | 55 |
| Polymerization Results | | | | | | |
| Total run time, hours | 20.9 | 7.5 | 2.5 | 5.8 | 6.5 | 22.9 |
| Total polymer produced, grams | 52 | 366 | 429 | 3,335 | 2.05 | 3.077 |
| Polymer yield on catalyst, grams/gram | — | 2,830 | 19,240 | 204,000 | 2,715 | 12,200 |

TABLE VII

| | Cuts 13–22 | Cuts 23–39 |
|---|---|---|
| General Properties | | |
| Annealed density, g/cc | 0.9734 | 0.9787 |
| Inherent viscosity, dl/g | 1.99 | 1.28 |
| Melt index, MF₁, g/10 min | 1.1 | 7.3 |
| Melt index, MF₁₀, g/10 min | 35 | 234 |
| Flow rate ratio, MF₁₀/MF₁ | 32 | 32 |
| Hexane extractables, wt % | 0.30 | 0.70 |
| Oven volatiles content, wt % | 0.04 | 0.33 |
| Stiffness, psig | 137,000 | 179,000 |
| Tensile Properties | | |
| Tensile strength at yield, psig at 2 in/min | 4,520 | — |
| Tensile strength at ultimate, psig at 2 in/min | 2,940 | 4,850 |
| Elongation at yield, % at 2 in/min | 11 | — |
| Elongation at ultimate, % at 2 in/min | 1,100 | 9.9 |
| Impact Properties | | |
| Tensile impact strength, ft-lb/in² | 82 | 22 |
| Izod impact strength, ft-lb/in² | 9.7 | 0.55 |
| Thermal Properties | | |
| Vicat softening point, °F | 263 | 259 | of the reactor were maintained at different temperatures. Reactor section one was operated at 160°F. while reactor section two was operated at 210° to 230°F. This was accomplished by varying the amount of isopentane quench added to each section. The catalyst used was a supported titanium compound and an aluminum triethyl cocatalyst was added in a weight ratio of cocatalyst to catalyst of three to one. The reactor pressure was controlled at 300 psig. and the hydrogen concentration was maintained at 40 mol percent. A polymer yield of 62,000 grams of polymer/gram of catalyst was obtained. The polymer melt index was measured at 5.5 with a $MF_{10}/MF_1$ of about 40 and a spiral flow of 18 inches. Polymer made under single temperature conditions having the same M.I. showed an $MF_{10}/MF_1$ value of about 34 and demonstrated a spiral flow of about 16 inches.

Spiral flow is an empirical method of assessing ease of processability of a polymer by measuring the length of flow in a special mold under specified temperature and pressure conditions. The longer the spiral flow the easier is the processability.

What is claimed is:

1. An essentially isobaric, essentially total, reactor off-gas recycle process comprising:
   a. removing from a horizontal, vapor state reactor operating at polymerization conditions, off-gases containing at least quench liquid vapor and one or more polymerizable monomers from above a stirred, subfluidized bed of polymer distributed within the one or more polymerization sections of said reactor and removing entrained polymer from said off-gases to form a reactor off-gas stream;
   b. condensing quench liquid from and removing any remaining entrained polymer from said reactor off-gas stream to form liquid recycle which contains at least said quench liquid and said any remaining entrained polymer and gaseous recycle which contains a reduced amount of said quench liquid vapor;
   c. leading said gaseous recycle together with at least make-up of said one or more polymerizable monomers to one or more inlets spaced along said reactor and positioned largely underneath the surface of said bed and introducing said gaseous recycle and said at least make-up into said reactor;
   d. leading a first portion of said liquid recycle to a plurality of inlets spaced along said reactor and located above the surface of said bed and introducing said portion into said reactor;
   e. leading a second smaller portion of said liquid recycle together with make-up of at least one catalyst component to one or more inlets spaced along said reactor and introducing said portion into said reactor; and
   f. introducing make-up quench liquid into said reactor.

2. The process of claim 1 wherein said reactor contains more than one polymerization section and each such section is individually controlled in respect of polymerization temperature, polymer production rate, or both.

3. The process of claim 2 wherein said second smaller portion is essentially free of said at least one catalyst component.

4. The process of claim 2 wherein hydrogen is contained in said off-gases.

5. The process of claim 3 wherein hydrogen is contained in said off-gases.

6. The process of claim 5 wherein said monomer is at least ethene.

7. The process of claim 5 wherein said monomer is at least propene.

8. The process of claim 5 wherein said monomer is at least butne-1.

9. The process of claim 5 wherein said monomer is at least vinyl chloride.

10. The process of claim 5 wherein said monomer is at least 4-methyl-pentene-1.

11. The process of claim 5 wherein said monomer is at least butadiene.

12. The process of claim 5 wherein said monomer is at least styrene.

13. The process of claim 6 wherein said quench liquid is isobutane or isopentane.

14. The process of claim 7 wherein said quench liquid is isobutane, isopentane, propene, a mixture of propene and isobutane, or a mixture of propene and isopentane.

* * * * *

UNITED STATES PATENT OFFICE
CERTIFICATE OF CORRECTION

Patent No. 3,971,768  Dated July 27, 1976

Inventor(s) Edwin F. Peters, et al.

It is certified that error appears in the above-identified patent and that said Letters Patent are hereby corrected as shown below:

Col. 1, line 37 "cn" should be -- can
" 2, "36,37 "pulsed gases" should be -- pulsed purge gases
" 4, " 40 "in" should be -- into
" 4, " 54 "monomer, similarly" should be -- monomer similarly
" 5, " 12 "liquid on the" should be -- liquid to the
" 6, " 5 "portion separated" should be -- portion of separated
" 6, " 12 "inlet 123-129" should be -- inlets 123-129
" 6, " 25 "monomer is said" should be -- monomer in said
" 6, " 58 "between liqid" should be -- between liquid
" 8, " 32 "catalysts," should be -- catalysts.
" 9, " 2 "apropriate rate" should be -- appropriate rate
" 9, " 11 "polymer pumps" should be -- polymer sumps
" 9, Table I "Mw/Mn" should be -- $\overline{M}w/\overline{M}n$
 1st line under Molec. Wt.
" 10, line 68 "-erties;" should be -- erties:
" 11, Last "Mw/Mn" should be -- $\overline{M}w/\overline{M}n$
 heading in Table III
" 13, line 6 "Reaction as" should be -- Reaction gas
 Left hand col., Table VI
" 14, line 5 "(35 milli-" should be -- (33 milli-
" 16, " 2 "butne" should be -- butene
 Claim 8

Signed and Sealed this

Nineteenth Day of October 1976

[SEAL]

Attest:

RUTH C. MASON
Attesting Officer

C. MARSHALL DANN
Commissioner of Patents and Trademarks